United States Patent Office 3,335,144
Patented Aug. 8, 1967

3,335,144
METHOD OF PRODUCING PYRIDINE AND 2-PICOLINE BY DECARBOXYLATION
Francis E. Cislak and William R. Wheeler, Indianapolis, Ind., assignors to Reilly Tar & Chemical Corporation, Indianapolis, Ind., a corporation of Indiana
No Drawing. Filed Aug. 10, 1964, Ser. No. 388,719
4 Claims. (Cl. 260—290)

This application is a continuation-in-part of our application Ser. No. 241,480 filed Dec. 3, 1962, and now abandoned.

Our invention relates to a new process of preparing pyridine and 2-picoline. More specifically, it relates to a process of preparing pyridine and 2-picoline from 2,6-lutidine.

Many processes are known for the synthesis of pyridine compounds. Such processes generally result in mixtures of pyridine bases. Thus, the reaction of acetaldehyde and ammonia yields 2-picoline and 4-picoline in addition to a mixture of several other alkylpyridines. The interaction of acetaldehyde, formaldehyde, and ammonia gives mainly pyridine and 3-picoline as well as many other pyridines in smaller amounts.

The hitherto known processes for producing pyridine cannot be operated economically unless the 3-picoline produced simultaneously is also utilized. The demand for 3-picoline is limited. Therefore, pyridine is not made in quantities sufficient to meet the requirements of industry.

Likewise, heretofore known processes for the production of 2-picoline cannot be operated profitably unless the 4-picoline produced is also marketed. The amount of 4-picoline that can be sold is relatively small. Hence, the production of 2-picoline is too small to meet the demands of producers of 2-vinylpyridine.

We have discovered that we can produce simultaneously 2-picoline and pyridine from 2,6-lutidine. Our process yields the two pyridine bases which are in greatest commercial demand, pyridine and 2-picoline. And we make these without the need of producing unwanted by-product bases!

We have found that by the interaction of water and 2,6-lutidine we can prepare pyridine and 2-picoline:

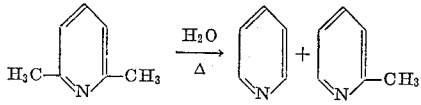

In carrying out our invention we prepare a mixture of 2,6-lutidine and water. This solution of 2,6-lutidine and water is vaporized and the vapors passed through a suitable reactor containing a contact mass. The temperature of the reactor is maintained between about 300° C. and 600° C. and preferably between about 400° C. and 500° C. We prefer to conduct our process in a continuous manner although that is not necessary.

The reactor used may be of various types. We prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The contact mass used may be any of a large number of inert catalyst supports as well as the numerous dehydrogenation catalysts. A highly satisfactory way of carrying out our invention is as follows. The parts are by weight.

*Example 1*

We prepare a solution of one part of 2,6-lutidine in about 3.5 parts of water. The aqueous 2,6-lutidine solution is vaporized. The vapors are passed through a fluid catalyst type reactor containing a fluidized catalytic bed of nickel-alumina catalyst (10% nickel on H-41 alumina). The temperature of the reactor is maintained at about 400° C. As the vapors of water and 2,6-lutidine pass through the reactor, a reaction occurs whereby pyridine and 2-picoline are formed. The vapors of the unchanged reactants and the reaction products are condensed as they emerge from the reactor, and the condensate is collected in a suitable receiver. The condensate as recovered contains more than 50% water. This water may be removed by the addition of flake caustic soda and separating the resulting aqueous caustic from the pyridine bases. The crude dry bases are fractionated to recover pyridine, 2-picoline, and unchanged 2,6-lutidine.

Our invention does not reside in the discovery of a new catalyst nor any new contact mass. What we have discovered is that the vapor phase interaction of water and 2,6-lutidine at high temperatures in the presence of a contact mass, gives pyridine and 2-picoline in good yields.

The 2,6-lutidine used in Example 1 is relatively pure 2,6-lutidine (98% or better). We need not, however, use pure 2,6-lutidine. We may, if we choose, use a mixture of pyridine bases which contains a substantial quantity of 2,6-lutidine.

In Example 1 we used 3.5 parts of water for each part of 2,6-lutidine. While we prefer to use an excess of water, we need not, however, use the specific ratio of Example 1.

The temperature at which our reaction may be conducted may be varied widely. In general, we prefer to have the reaction temperature above about 300° C. and below about 600° C. More desirably we prefer that the reaction temperature should be between about 400° C. and 500° C.

In place of the nickel-alumina catalyst, we may use non-catalytic contact masses, such as alumina, silica-alumina, etc. Or we may use catalytic contact masses. Among the catalysts we have found useful in carrying out our reaction are the catalysts which are known to be useful for the catalytic dehydrogenation of cycloparaffins. The catalysts which we prefer in our process comprise the metals and metal oxides of the iron group, particularly cobalt and nickel. Other useful dehydrogenation catalysts comprise platinum, palladium, tungsten, and also oxides selected from the metals of the left hand column of groups 5 and 6 of the periodic table and particularly the oxides of molybdenum, chromium, and vanadium.

*Example 2*

We prepare a solution of one part of 2,6-lutidine in about four parts of water. The aqueous 2,6-lutidine solution is vaporized. The vapors are passed through a fluid catalyst type reactor containing a fluidized catalytic bed of molybdenum-alumina catalyst (10% $MoO_3$ on alumina). The temperature of the reactor is maintained at about 450–500° C. As the vapors of water and 2,6-lutidine pass through the reactor, a reaction occurs whereby pyridine and 2-picoline are formed. The vapors of the unchanged reactants and the reaction products are condensed as they emerge from the reactor, and the condensate is collected in a suitable receiver. The condensate as recovered contains more than 50% water. This water may be removed by the addition of flake caustic soda and separating the resulting aqueous caustic from the pyridine bases. The crude dry bases are fractionated to recover pyridine, 2-picoline, and unchanged 2,6-lutidine.

*Example 3*

The process of Example 1 is repeated with the exception that the reactor contains a nickel-kaolin catalyst (10% nickel on kaolin) in place of the nickel-alumina catalyst and the temperature of the reactor is maintained at about 420° C.

*Example 4*

The process of Example 2 is repeated with the exception that the reactor contains a vanadia-alumina catalyst (8% $V_2O_5$ on alumina) in place of the molybdenum-alumina catalyst.

*Example 5*

The process of Example 2 is repeated with the exception that the reactor contains a chromium oxide-alumina catalyst (10% $Cr_2O_3$ on alumina) in place of the molybdenum-alumina catalyst.

*Example 6*

The process of Example 1 is repeated with the exception that a cobalt-diatomaceous earth catalyst is used in place of the nickel-alumina catalyst.

The nickel-alumina catalyst of Example 1 was prepared by dissolving three pounds of nickel metal in an excess of nitric acid. After all the metal was dissolved, the unreacted nitric acid was destroyed by the addition of warm 90% formic acid. The resulting aqueous solution of nickel nitrate was added with stirring to 30 pounds of an activated alumina (H-41 made by Alcoa). After the mixture was homogeneous, it was dried in an oven at 40° C. until the bulk of the water was evaporated. The semi-dried catalyst was added, with vigorous stirring, to an excess of sodium carbonate solution. Then the catalyst was repeatedly washed, by decantation, with distilled water until a conductance meter indicated little change in electrolyte on successive washings. The catalyst was drained of excess water, dried at 40° C., and then placed in the fluid bed catalytic reactor. Then the catalyst was fluidized with gaseous anhydrous ammonia, a small amount of nitrogen was used to aid in the fluidization. Heat was applied to the reactor at such a rate that within eight hours the temperature of the reactor was raised to 300° C. and within twelve hours was raised to 500° C.

The molybdenum catalyst of Example 2 was prepared by dissolving 24.7 pounds of $(NH_4)_6Mo_7O_{24} \cdot 4H_2O$ in 18 gallons of distilled water. The resulting solution was sprayed onto 201 pounds of an activated alumina support contained in a rotating stainless steel cylindrical vessel. The catalytic mass was dried, placed in the reaction vessel, and treated with ammonia gas for about two hours while being maintained at a temperature of about 500° C.

The nickel-kaolin catalyst of Example 3 was prepared by dissolving 113 pounds of $Ni(No_3)_2 \cdot 6H_2O$ in about 10 gallons of water. The resulting solution was poured onto 200 pounds of dried kaolin. The paste thus formed was dried in an oven (60° C.). Then the nickel salt was precipitated onto the kaolin by treating it with several small portions of a concentrated ammonium carbonate solution. Then the catalyst was washed, dried, and placed in the reactor. The catalyst was reduced by passing gaseous ammonia through the reactor while maintaining the catalyst at a temperature of about 500° C.

The vanadium oxide catalyst used in Example 4 was prepared by suspending 21 pounds of ammonium vanadate in 40 pounds of distilled water. Then 51 pounds of oxalic acid was gradually added; carbon dioxide was evolved. The so prepared solution was sprayed onto 200 pounds of alumina support contained in a heated rotating stainless steel cylindrical vessel. The catalyst mass was dried, ground, and placed in the reactor. The catalyst was treated with gaseous ammonia for two hours while it was maintained at a temperature of about 500° C.

The $Cr_2O_3$ catalyst used in Example 5 was prepared by dissolving 26 pounds of $CrO_3$ in approximately 100 pounds of distilled water. The resulting solution was sprayed onto about 200 pounds of alumina catalyst support contained in a heated rotating stainless steel cylindrical vessel. The catalyst mass was dried and placed in the reactor. The catalyst, maintained at a temperature of about 500° C., was treated with gaseous ammonia for about two hours.

The cobalt-diatomaceous earth catalyst used in Example 6 was produced by essentially the same steps used in making the nickel-kaolin catalyst with the exception that cobalt nitrate was used in place of the nickel nitrate and diatomaceous earth was used in place of the kaoline.

We claim as our invention:

1. The process of preparing pyridine and 2-picoline which comprises passing a mixture consisting essentially of the vapors of water and 2,6-lutidine through a reactor containing a dehydrogenation catalyst maintained at a temperature between about 400° C. and 500° C.

2. The process of preparing pyridine and 2-picoline which comprises passing a mixture of the vapors of water and pyridine bases containing 2,6-lutidine through a reactor containing nickel-alumina catalyst maintained at a temperautre between about 400° C. and 500° C.

3. The process of claim 1 in which the catalyst in which the catalyst is a dehydrogenation catalyst of the iron group.

4. The process of claim 1 in which the catalyst is a nickel dehydrogenation catalyst.

No references cited.

WALTER A. MODANCE, *Primary Examiner.*

ALAN L. ROTMAN, *Assistant Examiner.*